United States Patent [19]
Schink

[11] 4,240,464
[45] Dec. 23, 1980

[54] COMBINED PRESSURE CONTROL AND SHUT-OFF VALVE

[75] Inventor: Richard R. Schink, Racine, Wis.

[73] Assignee: Milwaukee Cylinder Corporation, Cudahy, Wis.

[21] Appl. No.: 87,661

[22] Filed: Oct. 24, 1979

[51] Int. Cl.³ .......................................... F16K 31/524
[52] U.S. Cl. ............................ 137/505.42; 137/116.5; 74/568 R
[58] Field of Search ............................... 251/251, 263; 137/116.5, 505.42; 267/175, 177; 74/568 R

[56] References Cited

U.S. PATENT DOCUMENTS

| 1,264,083 | 4/1918 | Jouffret | 74/568 |
|---|---|---|---|
| 2,816,812 | 12/1957 | Peck | 137/505.42 |
| 2,981,280 | 4/1961 | Cornelius | 137/116.5 |
| 3,097,543 | 7/1963 | Godsil et al. | 74/568 |
| 3,205,670 | 9/1965 | Carolan | 137/116.5 |
| 3,250,288 | 5/1966 | Hammon | 137/116.3 |
| 3,357,687 | 12/1967 | Vanderpoel | 137/505.42 |
| 3,665,956 | 5/1972 | Hammon | 137/116.5 |
| 3,926,208 | 12/1975 | Hoffman et al. | 137/116.5 |
| 4,111,222 | 9/1978 | Hassell | 137/116.5 |
| 4,164,343 | 8/1979 | Graebner | 251/315 |

Primary Examiner—William R. Cline
Assistant Examiner—H. Jay Spiegel
Attorney, Agent, or Firm—James E. Nilles

[57] ABSTRACT

For maintaining a predetermined pressure at a controlled pneumatic device, a unit of this invention has a body with an inlet port connectable with a pressure gas source, an outlet port connectable with said device, a pressure chamber at all times communicated with the outlet port, and an annular valve seat through which gas can flow from the inlet port to the pressure chamber. The position of a valve element that throttles gas flow through the valve seat is controlled by a diaphragm having one surface exposed in the pressure chamber and a helical compression spring having an inner end bearing against the opposite diaphragm surface. A cam rotatably supported on the body controls the position of the other end of the spring, for quick stepless adjustment of spring preload and thus of outlet port pressure. An eccentric bushing enables calibrating adjustment of the position of the cam axis for either a maximum or a minimum outlet port pressure. A tubular stem connecting the diaphragm with the valve element bleeds off pressure gas from the pressure chamber when pressure in that chamber exceeds the value for which the cam is adjusted.

2 Claims, 7 Drawing Figures

COMBINED PRESSURE CONTROL AND SHUT-OFF VALVE

FIELD OF THE INVENTION

This invention relates to a control unit comprising a gas pressure regulator which is connectable between a pressure gas source and a device that is operated by pressure gas and whereby gas pressure at the device is maintained at substantially a desired value; and the invention is more particularly concerned with an adjustable gas pressure control unit whereby the pressure to be maintained at a device downstream from the unit can be readily altered within a predetermined range of pressure values, one of which can be zero, so that the unit can also serve as a shut-off valve.

BACKGROUND OF THE INVENTION

A system having a device such as a pneumatic motor that is operated by compressed air or other pressure gas often includes a regulator whereby the pressure of gas at the device is prevented from exceeding a predetermined value, even though pressure at the source of the gas may be substantially higher than that value. A generally conventional type of regulator for this purpose comprises a body having an inlet port that is connectable with the pressure gas source and an outlet port connectable with the pneumatically operated device. Inside the body is a throttling valve that comprises a poppet-like valve element which is movable toward and from a coaxial annular valve seat to provide a variable restriction to flow of gas from the inlet port to the outlet port. The position of the valve element is controlled by an actuator comprising a diaphragm that is coaxial with the valve element and has one of its surfaces exposed in a pressure chamber communicated with the outlet port while its opposite surface is acted upon by a coaxial helical spring. A coaxial stem that extends through the valve seat serves as a connection between the diaphragm and the valve element. The arrangement is such that the spring, acting through the diaphragm, tends to force the valve element away from its seat, whereas pressure at the outlet port, manifested in the pressure chamber, tends to overcome the biasing force of the spring so that the valve element approaches its seat and increasingly restricts flow through the body as pressure at the outlet port increases.

It is apparent that the pressure which such a regulator maintains at its outlet port—and hence at a pneumatic device connected with that port—is dependent upon the biasing force which the helical spring exerts against the diaphragm. To provide for adjustment of that biasing force, it has heretofore been conventional for the spring of such a regulator to react against an adjustable spring seat that had a threaded connection with the body. Screwing the spring seat inwardly relative to the body increased the biasing force that the spring imposed upon the diaphragm and thus increased the pressure maintained at the outlet port.

Heretofore it has usually been regarded as undesirable to permit quick and easy changes in the pressure to be maintained by a gas pressure regulator, since this could encourage unauthorized tampering that could defeat the purpose of the regulator. From this standpoint it was seen as an advantage that the screw threaded pressure control adjustment was relatively inconvenient to manipulate and required that a substantial length of time be spent in making any substantially large change in adjustment.

By contrast, the present invention is based upon the recognition that certain important and heretofore unappreciated advantages can be gained from the provision of simple, inexpensive and reliable means for adjusting a gas pressure regulator of the general type described above, whereby the value of gas pressure to be maintained at the regulator outlet can be changed almost instantaneously by the mere swinging of a lever and whereby the pressure value for which the regulator is adjusted is accurately denoted by the position of that lever. Specifically, a pressure regulator that is easily and practically instantaneously adjustable as to the pressure that it is to maintain has a versatility not available in prior regulators and can be employed, for example, as a variable speed control for a pneumatic motor with which it is connected.

It is thus a general object of this invention to provide a gas pressure regulator of the type described above which is quickly and easily adjustable to maintain any selected pressure within a stepless range of pressures.

Another object of the invention is to provide means in a gas pressure regulator of the character described whereby the pressure to be maintained by the regulator can be quickly and easily set to any desired value within a stepless range of values, and whereby provision is made for a calibrating adjustment of either the low or the high limit of that range.

In this connection it is a more specific object of the invention to provide simple adjusting structure which comprises a swingable lever or the like whereby pressure maintained by a pressure regulator can at any time be readily adjusted within a stepless range, together with calibration means, intended to be changed only infrequently, whereby the top or the bottom limit of that range can be steplessly adjusted, said structure being supported by a single screw or the like whereby said calibration means can be releasably locked in any position of adjustment in which it is established, and also comprising means cooperating with said screw to frictionally retard displacement of the swinging lever out of any position in which it may be established.

The attainment of the above-stated objectives of the invention results in the attainment of still another object of the invention, and one that is more far-reaching in its significance than those set forth above, namely the provision of a gas pressure regulator which can also serve as a shut-off valve and which is thus capable of fulfilling a triple role as a speed control, shut-off control and pressure regulator. This objective is obtained with the control unit of the present invention in the particular case in which the lower limit of the range of pressure values through which it is transiently adjustable is chosen as zero.

It follows that it is an important object of this invention to provide a single relatively simple and inexpensive control unit which can in many cases function very satisfactorily as the only control unit needed in a pneumatic system in which it is installed.

It is thus another object of the invention to provide a simple but very versatile control unit for a pneumatic system, which is, at most, only slightly more expensive than a heretofore conventional gas pressure regulator but which makes possible the elimination or omission of other control units in a pneumatic system in which it is incorporated, thus affording substantial reductions in the cost, complexity and bulkiness of the system while at the same time rendering the system substantially more reliable and easier to control.

Another and more specific object of the invention is to provide a control unit comprising a combined pressure regulator and shut-off valve of the character described that is particularly suitable for installation in automotive and similar systems by reason of being relatively immune to the effects of vibration, said unit having means for preventing pressure build-ups in portions of the system downstream from the unit that might result from vibration.

SUMMARY OF THE INVENTION

In general, the pressure gas control unit of this invention is of the type that comprises a body in which there is an inlet port connectable with a pressure gas source, an outlet port connectable with a device operable by pressure gas, a pressure chamber at all times communicated with said outlet port, throttling means comprising a valve element movable in said body in opposite opening and closing directions for variably restricting flow of pressure gas from said inlet port to said pressure chamber, and pressure responsive control means for said valve element, comprising a diaphragm having one of its surfaces exposed in said pressure chamber and a helical expansion spring which has an inner end bearing against the opposite surface of said diaphragm and which is coaxially confined in a bore in the body that opens outwardly to one side thereof. There is a connection between said diaphragm and the valve element whereby the latter tends to be moved in its closing direction in response to pressure in said pressure chamber and in its opening direction in response to biasing force exerted upon the diaphragm by said spring. The control unit of this invention is characterized by adjusting means for readily and quickly adjusting the value of gas pressure which the unit maintains at its outlet port to any selected one of a stepless range of gas pressure values, to provide for controlled variation of the speed of a pressure gas operated device connected with the outlet port, said adjusting means comprising: a cam rotatable about a cam axis; and supporting means mounting the cam on the body, at said one side thereof, for rotation about said cam axis. The cam has a cam surface which is radially spaced from said cam axis and which extends across the bore and receives the outer end portion of said spring, and said cam surface is so arranged that the position of said outer end of the spring along the axis of said bore depends upon the rotational position of the cam. The invention is further characterized by calibrating means cooperable with said supporting means for effecting bodily shifting adjustment of the cam in directions parallel to the axis of said bore, so that the unit can be calibrated to maintain a predetermined pressure at the outlet port when the cam is in a predetermined position of its rotation.

An actuator for the cam preferably comprises a lever connected with it and projecting substantially radially in relation to the cam axis.

The supporting means for the cam preferably comprises a boss projecting from said one side of the body, alongside said bore in the body, and a screw secured to said boss and projecting therefrom across the bore.

The calibrating means preferably comprises a tubular bushing having an external cylindrical surface on which said cam is journaled for rotation and having a bushing bore which is eccentric to said cylindrical surface so that adjustment of the cam axis parallel to the axis of said bore in the body is effected by rotation of the bushing about the screw, and the screw cooperates with the boss to axially clampingly confine the bushing in any position of rotation in which it may be established.

Preferably the valve seat is annular and is between the valve element and the diaphragm, the valve element is biased lightly towards the valve seat, and the connection between the diaphragm and the valve element comprises a tubular stem which is substantially coaxial with the valve seat and which has one end portion which extends through the diaphragm and is fixed thereto and which has its opposite end normally abuttingly engaged against the valve element, the bore through said tubular stem being thus normally blocked by the valve element but providing for restricted flow of pressure gas out of the pressure chamber through the diaphragm when the valve element is displaced out of engagement with the valve seat and said stem, as under the influence of vibration.

BRIEF DESCRIPTION OF DRAWINGS

In the accompanying drawings, which depict what is now regarded as a preferred embodiment of the invention.

DETAILED DESCRIPTION OF PREFERRED EMBODIMENT OF THE INVENTION

Figure 1:
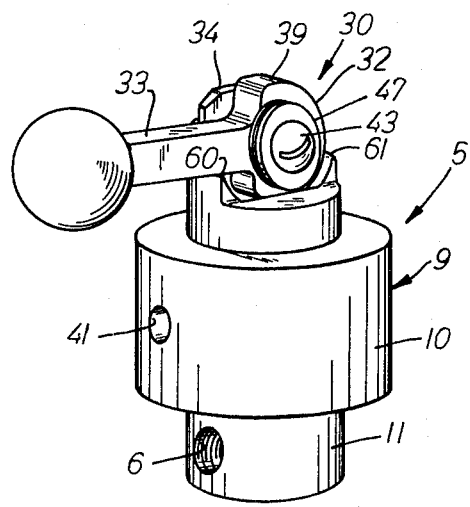
FIG. 1 is a perspective view of a gas pressure regulator having adjusting means embodying the principles of the present invention, shown in its minimum-pressure or shut-off condition.

Referring now to the accompanying drawings, the numeral 5 designates generally a control unit that embodies the principles of this invention, having an inlet port 6 for connection with a source of pressure gas and an outlet port 7 for connection with a pneumatically actuated device 8. In this case the pneumatic device 8 is illustrated as a single-acting cylinder jack which extends when pressure gas is fed to it and which is spring-biased to retract when gas pressure is relieved. It is assumed that the jack 8 has a small bleed-off that provides for its controlled retraction when pressure gas feed to it is cut-off and that its rate of extension depends upon the pressure of gas being fed to it. Upon these assumptions, the unit 5 can be employed both for control of the direction of operation of the jack 8 and for control of its rate of extension, without need for other control units in the system.

The body 9 of the control unit 5 is shown as comprising a generally cylindrical upper body member 10 and a coaxial cylindrical lower body member 11 that can be of smaller diameter than the upper member 10. The inlet and outlet ports 6 and 7 are formed in the lower body member 11 and open to diametrically opposite sides thereof.

The upper body member 10 has a coaxial bore 12 therethrough that has several stepwise increases in diameter towards its lower end, where its largest diameter portion is internally threaded to receive the externally threaded upper portion 14 of the lower body member 11 and thus provide a connection between the body members 10 and 11.

The lower body member 11 has a coaxial upwardly opening well 15 therein which increases in diameter stepwise upwardly. In the small-diameter lowest portion of the well 15 is a poppet-like valve element 16 which cooperates with a coaxial tubular seat member 17 that is threaded downwardly into a wider-diameter portion of the well 15. The valve element 16 is slideable up and down, towards and from a closed position in which its flat top surface engages the bottom end of the seat member 17, and it is lightly biased upwardly towards that closed position by means of a small expansion spring 18 which is concentrically confined in the lowermost portion of the well 15 and reacts against the bottom of the well.

The widest-diameter upper portion of the well 15 in the lower body member defines a pressure chamber 19 that is closed at its top by a diaphragm 20. The marginal edge portion of the diaphragm 20 is sealingly clamped between the annular top edge of the lower body meber 11 and a downwardly facing circumferential shoudler 21 in the upper body member, defined by one of the bore enlargements therein.

The pressure chamber 19 is communicated with the inlet port 6 only through the bore in the tubular valve seat member 17, but the pressure chamber is at all times directly communicated with the outlet port 7 by a short, nearly vertical passage 22 in the lower body member. Since the inlet port 6 is communicated with the outlet port 7 only through the pressure chamber 19, no gas can flow through the body 9 when the valve element 16 is in its fully closed position. When not engaged with the seat 17, the valve element 16 throttles the flow of gas between the ports 6 and 7 to an extent that depends upon its distance from that seat.

The position of the valve element 16 is essentially controlled by the diaphragm 20 in cooperation with a relatively stiff spring 23 that bears against the upper surface of the diaphragm and is confined in the bore 12 in the upper body member. Inasmuch as the bottom surface of the diaphragm 20, which is exposed in the pressure chamber 19, is acted upon by pressure gas in that chamber, the diaphragm 20 tends to be displaced upward by forces proportional to the pressure of gas at the outlet port 7, while the spring 23 tends to resist such upward displacement. Interposed between the diaphragm 20 and the bottom end of the spring 23 is a coaxial stiffening disc 24 from which a stiff tubular stem 25 projects downwardly to have its lower end abut the top surface of the valve element 16 through the bore in the tubular seat member 17. Thus, through the stem 25, downward displacement of the diaphragm 20 causes a corresponding downward displacement of the valve element 16. Under the upward biasing force exerted upon the valve element 16 by the small spring 18, the valve element likewise moves upwardly towards its seat in unison with upward displacement of the diaphragm 20. The small spring 18 does not exert any substantial force in opposition to the biasing force of the larger spring 23 but merely tends to maintain the valve element 16 in engagement with the bottom of the tubular stem 25 so that there is a connection between the diaphragm 20 and the valve element 16 through the stem 25, which connection, however, is one that accommodates a certain amount of lateral shifting between the connected elements, such as may occur with flexing of the diaphragm.

It will be recognized that the structure described to this point is generally conventional in gas pressure regulators, except that in the present case the stem 25 is tubular, for reasons explained hereinafter. In performing its regulating function the unit 5 also operates in a generally conventional manner. At any instant, the position of the diaphragm 20—and hence of the valve element 16—is that at which there is an equilibrium between the upward force exerted upon the diaphragm by pressure gas in the pressure chamber 19 and the downward force exerted upon it by the larger spring 23. Accordingly, the pressure that will be maintained at the outlet port 7 depends upon the biasing force that the spring 23 imposes upon the diaphragm 20, and that biasing force is in turn dependent upon the position along the bore 12 of a spring seat member 28 against which the upper end of the spring 23 reacts.

According to the present invention, the axial position of the spring seat member 28 can be accurately controlled by and quickly and easily changed by the adjusting means of this invention, which is designated generally by 30 and is located at the top of the body 9. The adjusting means 30 comprises a cam 32 that is rotatable on the upper body member 10 to control the axial position of the spring seat member 28, and a lever or handle 33 that projects radially from the cam 32 to facilitate rotation of it and to provide a clear indication of its rotational position.

The support for the cam 32 comprises a single boss 34 on the upper body member 10, preferably formed integrally with it, which projects upwardly from the top of that body member alongside the bore 12 therein. Secured to the boss 34 is a screw 35 that projects across the bore 12, normal to the axis of the bore, and, in turn, the cam 32 is journaled on an eccentric bushing 36 that surrounds the shank of the screw 35. The cam 32 is thus rotatable about an axis which is concentric to the external cylindrical surface 37 of the bushing 36. The peripheral surface 39 of the cam 32, which is eccentric to its axis, is engaged by the top surface of the spring seat member 28, which serves as a cam follower.

Figure 2:
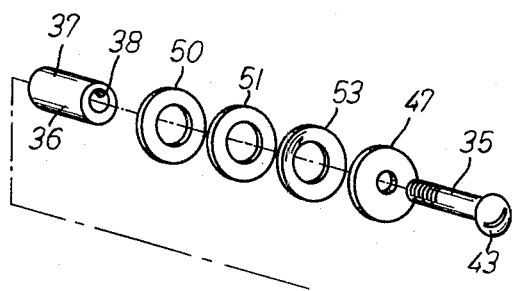
FIG. 2 is a view similar to FIG. 1 but showing the adjusting lever in a different position providing for a higher pressure.
Figure 2:
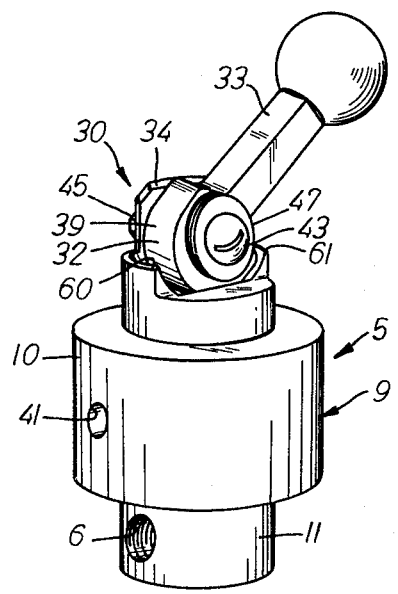
Figure 3:
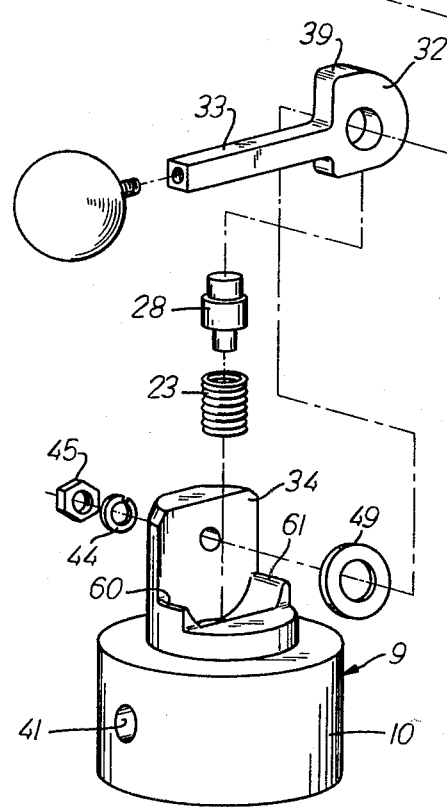
FIG. 3 is an exploded perspective view of the adjusting means for the regulator shown in FIG. 1.

The cam surface 39 extends halfway around the cam 32, and the lever 33, which can be formed integrally with the cam 32 as best seen in FIG. 3, projects radially from the cam at its side opposite the cam surface 39. The lever 33 is thus swingable through 180°, from the position shown in FIG. 1, in which the smallest-radius portion of the cam surface 39 engages the spring seat member 28, to and beyond the position shown in FIG. 2. The limit positions of swinging motion of the lever 33 can be defined by stop abutments 60 and 61 that are formed integrally with the upper body member 10.

As the lever 33 is swung away from its position shown in FIG. 1, the spring seat member 28 is engaged by portions of the cam surface 39 that are of progressively increasing radius, and the spring seat member is, accordingly, progressively moved downward in the bore 12 to correspondingly increase the biasing preload that the spring 23 imposes upon the diaphragm 20. It will be observed that the spring reaction force is taken by the cam 32, to which it is transmitted by the spring seat member 28. To minimize lateral displacement of the upper end of the spring 23 in consequence of rotation of the cam 32, the spring seat member 28 is preferably made of a low-friction plastic. The spring seat member 28 can also serve as a seal to prevent escape from the top of the bore 12 of the gases vented thereinto, as explained hereinafter.

With the adjusting lever 33 in its position shown in FIG. 1, the gas pressure maintained at the outlet port 7 is at a minimum value that depends upon the rotational adjustment of the eccentric bushing 36, as explained hereinafter. That minimum pressure value can be zero, if desired, so that the unit 5 serves as a shut-off valve in addition to performing its pressure controlling function.

In the shut-off position of the cam 32 (illustrated in FIG. 4) the preload imposed upon the spring 23 is such that the valve element 16 occupies its closed position, engaged against the bottom of the tubular seat member 17 to prevent flow of gas from the inlet port 6 to the outlet port 7. The small spring 18 that holds the valve element 16 against the seat 17 exerts a biasing force so light that vibration might slightly unseat the valve element from time to time. Any leakage gas due to such occasional openings is vented through the tubular stem 25 that provides the connection between the diaphragm 20 and the valve element 16, which stem extends through the diaphragm 20 and the reenforcing disc 24 that overlies the top surface of the diaphragm. In like manner, whenever the cam 32 is rotated towards its closed position, to effect a reduction of the pressure maintained at the controlled device, the valve element 16 closes and the excess pressure is vented through the stem 25 and thus to the spring-housing bore 12 above the diaphragm. A lateral passage 41 in the upper body member 10, opening from the bore 12 to the exterior of the body, provides a vent for pressure gas bled off through the tubular stem 25, which vent can be connected with an exhaust duct if the pressure gas is of a noxious character.

At any time that the valve element 16 is being held off its seat by the diaphragm 20, the stem 25 will be engaged against the top surface of the valve element, and the bore in the tubular stem 25 will thus be sealed off, which is to say that whenever pressurization of the downstream portion of the system is required, escape of pressure gas through the tubular stem 25 will be prevented.

Figure 4:
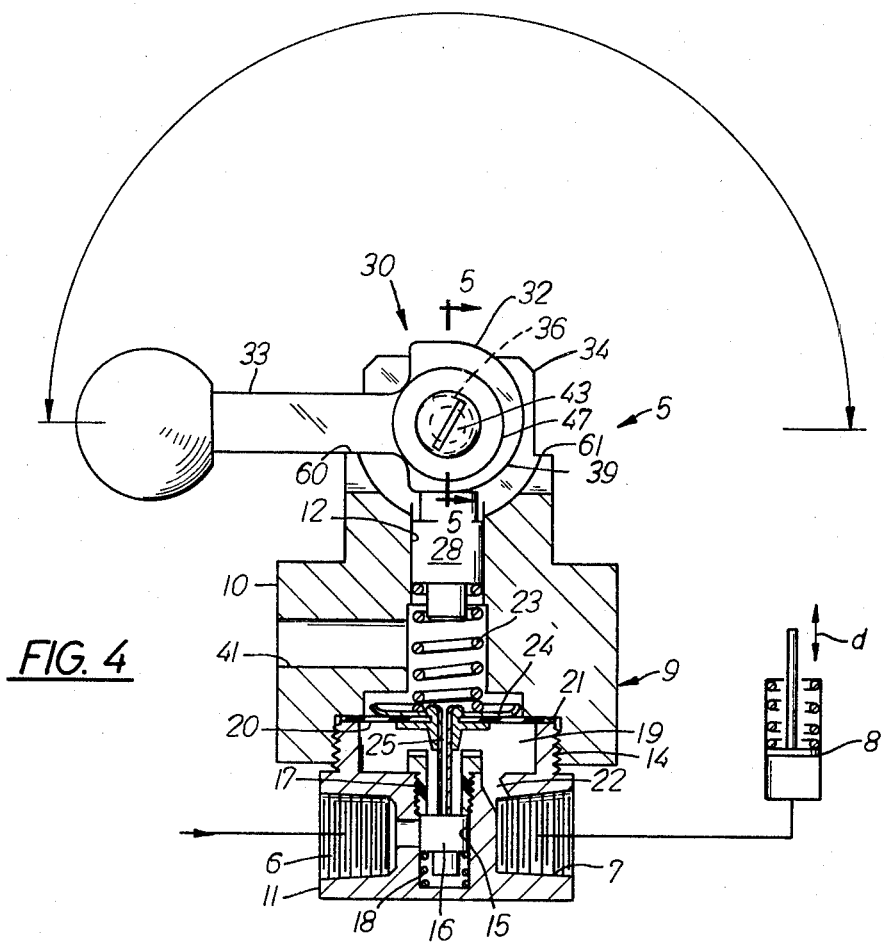
FIG. 4 is a view in vertical section through the regulator shown in FIG. 1, but on an enlarged scale and also showing schematically the connection of the regulator with a spring biased pneumatic cylinder motor to be controlled by it.
Figure 6:
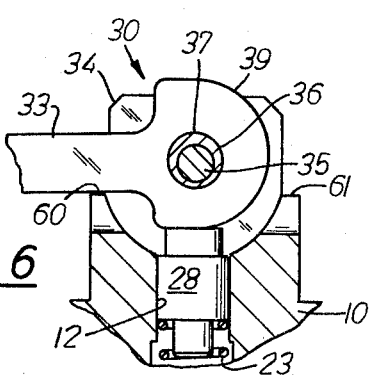
FIG. 6 is a fragmentary view in longitudinal section of a portion of the regulator, with its eccentric bushing adjusted to one position.

In some cases downward displacement of the diaphragm 20 and the valve element 16 should occur as soon as the lever 33 is swung away from its shut-off position shown in FIGS. 1 and 4. Therefore, with the lever 33 in its shut-off position, the spring seat member 28 must be in a position along the bore 12 that is rather critical but is nevertheless dependent upon a number of variables that are controllable only within tolerance limits. To compensate for these variables, the eccentric bushing 36 comprises a calibrating means that can be adjusted to raise and lower the axis about which the cam 32 rotates, and thus bodily displace the cam 32 itself, in directions parallel to the axis of the bore 12. It will be evident that the unit can be calibrated for a desired minimum pressure value other than zero. Alternatively, it can be calibrated for some desired maximum pressure value.

To provide for such calibrating adjustment, the bore 38 in the bushing 36, through which the screw 35 extends, is eccentric to the outer cylindrical surface 37 of the bushing about which the cam 32 rotates. Since rotational adjustment of the eccentric bushing 36 will normally take place at the time of manufacture or installation, and only infrequently thereafter, that bushing must be releasably lockable in any position to which it may be adjusted. To that end, the bushing 36 is confined against rotation by being axially clamped between the boss 34 and one end of the screw 35. As shown, the screw 35 has a large head 43 at its end remote from the boss 34, a plain shank that extends through the bushing 36 and the boss 34, and a threaded end portion on which is received a lock washer 44 and a nut 45 that is tightened to cause the necessary axial clamping force to be applied to the bushing 36. A plain washer 47 with an outside diameter substantially larger than that of the bushing 36 is interposed between the head 43 of the screw 35 and the adjacent end of the bushing 36.

Figure 5:
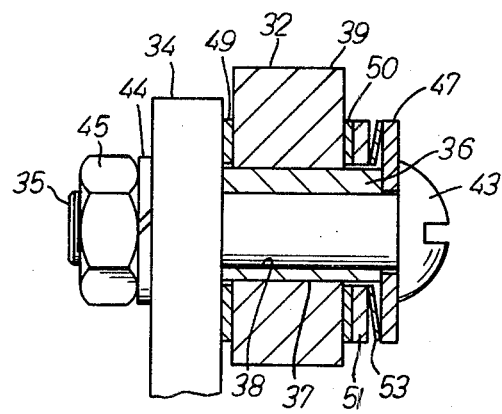
FIG. 5 is a sectional view taken on the plane of the line 5—5 in FIG. 4.
Figure 7:
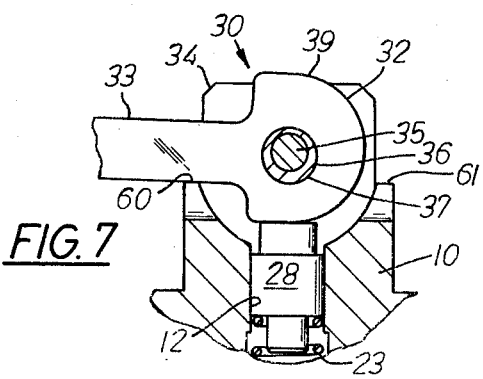
FIG. 7 is a view generally similar to FIG. 6, but showing the eccentric bushing adjusted to 180 degrees from the position shown in FIG. 6.

Although the cam 32 should be rather easily rotatable by swinging of the lever 33, it should obviously resist accidental displacement out of any position to which it may be swung, and by reason of the arrangement that is best seen in FIGS. 3 and 5, tightening of the nut 45 to lock the eccentric bushing 36 against rotation also causes friction to be applied to the cam 32. The axially opposite sides of the cam 32 are flat and are overlain by plastic washers 49 and 50 that surround the bushing 36. The plastic washer 49 is interposed between the cam 32 and the adjacent flat face of the boss 34, while the other plastic washer 50 is confined between the opposite axial face of the cam 32 and a metal washer 51. In turn, there is interposed between the metal washer 51 and the large washer 47 that is adjacent to the screw head 43 an annular spring 53 such as a wave washer or a belleville spring, whereby an axial biasing force is exerted. Hence tightening of the nut 45 loads the annular spring 53, which maintains the cam 32 under a frictional clamping force between the plastic washers 49 and 50.

From the foregoing description taken with the accompanying drawings it will be apparent that this invention provides a control unit for pressure gas systems that is quickly and easily adjustable to maintain, at a pneumatic device downstream from the unit, any desired pressure in a stepless range of pressures; and it will also be apparent that because the minimum pressure value in that range can be readily adjusted to zero, the control unit can further function as an effective shut-off valve.

I claim:

1. A pressure gas control unit of the type comprising a body in which there is an inlet port connectable with a pressure gas source, an outlet port connectable with a device operable by pressure gas and a pressure chamber at all times communicated with said outlet port, said control unit further comprising a valve element in said body movable axially in opening and closing directions for variably restricting flow of pressure gas from said inlet port to said pressure chamber, a coaxially displaceable pressure responsive control element for said valve element having opposite surfaces, one of which is exposed in said pressure chamber, and a helical expansion spring having an inner end bearing against the opposite surface of said control element and axially confined in a bore in the body that opens outwardly to one side thereof, said control element having a connection with said valve element whereby the latter tends to be moved in its closing direction in response to increasing pressure in said pressure chamber and in its opening direction in response to biasing force exerted upon the control element by said spring, said control unit being characterized by adjusting means for readily and quickly adjusting the value of gas pressure which said unit maintains at its outlet port to any selected one of a stepless range of values, said adjusting means comprising:
A. a cam rotatable about a cam axis;
B. supporting means mounting said cam on the body at said one side thereof, for rotation about said cam axis, said supporting means comprising
 (1) a boss on the body, alongside the bore and projecting from said one side of the body, and
 (2) a screw secured to said boss and projecting therefrom across said bore;
C. said cam having a cam surface which is radially spaced from said cam axis and which extends across said bore and receives the reaction of the outer end of said spring, said cam surface being so arranged that the position of said outer end of the spring along the axis of said bore depends upon the rotational position of the cam;
D. calibrating means cooperable with said supporting means for effecting bodily shifting adjustment of the cam in directions parallel to the axis of said bore, so that the unit can be calibrated to maintain a predetermined pressure at said outlet port when said cam is in a predetermined position of its rotation, said calibrating means comprising a tubular bushing
 (1) having an external cylindrical surface on which said cam is journaled for rotation, and
 (2) having a bushing bore which is eccentric to said cylindrical surface so that adjustment of the cam axis parallel to the axis of said bore in the body is effected by rotation of said bushing about said screw and the screw cooperates with the boss to axially clampingly retain the bushing in any position of rotation in which it may be established; and
E. means for inhibiting movement of the cam out of any rotational position in which it may be established, the last mentioned means comprising
 (1) annular friction means surrounding said bushing and axially adjacent to at least one side of said cam, and
 (2) an annular spring surrounding said bushing and cooperating with said screw and said boss to normally maintain said annular friction means engaged with said cam under axial clamping force.

2. The pressure gas control unit of claim 1, further characterized by:
F. a lever connected with said cam and projecting substantially radially in relation to the cam axis, said lever providing for rotation of the cam about its axis and by its position denoting the pressure which the control unit will maintain at said outlet port.

* * * * *